(12) United States Patent
Morikawa

(10) Patent No.: US 6,237,473 B1
(45) Date of Patent: May 29, 2001

(54) TRANSPORTING APPARATUS

(75) Inventor: Michio Morikawa, Utsunomiya (JP)

(73) Assignee: Rheon Machinery Co., Ltd., Tochigi-ken (JP)

( * ) Notice: Subject to any disclaimer, the term of this patent is extended or adjusted under 35 U.S.C. 154(b) by 0 days.

(21) Appl. No.: 09/689,652

(22) Filed: Oct. 13, 2000

(51) Int. Cl.[7] .............................. A21C 3/00; A21C 3/02; A21C 11/00; A21D 6/00; A23P 1/00

(52) U.S. Cl. .................... 99/450.2; 99/353; 99/443 C; 99/450.1; 198/345.1; 198/456; 425/101; 425/363; 425/373; 425/297; 425/321

(58) Field of Search ............... 99/353–355, 443 C, 99/443 R, 494, 477–479, 450.1–450.8; 198/345.1, 456; 264/173, 209, 285, 281; 425/101, 107, 115, 363, 373, 297, 140–148, 319–322, 329, 334–341, 397; 426/500–504, 231, 496, 512, 517

(56) References Cited

U.S. PATENT DOCUMENTS

| | | | |
|---|---|---|---|
| 4,905,583 | * | 3/1990 | Hayashi .......................... 99/450.2 |
| 4,994,293 | * | 2/1991 | Hayashi .......................... 426/501 |
| 4,996,915 | * | 3/1991 | Morikawa et al. ............... 99/450.2 |
| 5,078,585 | * | 1/1992 | Morikawa et al. ............... 425/321 X |
| 5,142,631 | * | 8/1992 | Ueno et al. ...................... 414/783 X |
| 5,169,664 | * | 12/1992 | Ueno et al. ...................... 198/379 X |
| 5,219,592 | * | 6/1993 | Hirabayashi et al. ............. 425/383 |
| 5,281,120 | * | 1/1994 | Morikawa et al. ............... 425/115 |
| 5,382,154 | * | 1/1995 | Morikawa et al. ............... 425/321 |
| 5,421,714 | * | 6/1995 | Morikawa et al. ............... 426/500 X |
| 5,440,974 | * | 8/1995 | Ueno et al. ...................... 99/450.2 |
| 5,460,081 | * | 10/1995 | Ueno et al. ...................... 99/353 X |
| 5,516,538 | * | 5/1996 | Ueno et al. ...................... 426/231 |

* cited by examiner

Primary Examiner—Timothy F. Simone
(74) Attorney, Agent, or Firm—Finnegan, Henderson, Farabow, Garrett and Dunner, L.L.P.

(57) ABSTRACT

An apparatus for transporting a dough sheet is provided. It has a centering apparatus for aligning the center of a dough sheet that is being fed with the center of the transporting apparatus. The centering apparatus includes a supporting member to support the dough sheet, sensors located at the supporting member to sense the side edges of the dough sheet, and an apparatus for shifting the dough sheet right or left relative to the transporting direction based on the results of the detection by the sensors.

3 Claims, 6 Drawing Sheets

TRANSPORTING APPARATUS

FIELD OF INVENTION

This invention relates to an apparatus for continuously transporting food dough in a system for continuously producing food dough, such as cake and bread dough. Particularly, it relates to an apparatus for centering a food dough sheet that is continuously supplied.

PRIOR ART

FIG. 5 shows a conventional apparatus for transporting food dough. It includes an apparatus for centering a dough sheet. An apparatus for extending food dough, such as cake dough, extends it to form a dough sheet that has a predetermined thickness (about 3 mm), and then feeds it to a following process. However, either the thickness or width, or both, of the extended dough sheet cannot avoid being varied due to various conditions, e.g., variations in the thickness and width of dough supplied from a dough-supplying mechanism located upstream. Also, the dough sheet sometimes meanders while being fed To adjust the meandering of the dough sheet and the deflection of the center line of it, a roller is located at the end of the transporting apparatus. The roller shifts the conveying surface of the transporting apparatus to the right or left, so that the dough sheet can be centered. This centering operation is manually performed while an operator observes it. That is, the operator suitably rotates a handle or lever of a driving shaft of the centering roller, so that the roller is shifted right or left relative to the advancing direction of the dough sheet.

In that prior-art apparatus, an operator always has to observe with the naked eye variations in the width of the dough sheet, etc. If the centering operation is not performed, the available width of the dough sheet will decrease, and thus at a following process much of the dough sheet cannot be available at both its sides, so that the productivity will decline.

SUMMARY OF INVENTION

This invention aims to resolve the above-mentioned problems by the prior-art centering apparatus. Thus, this invention is to provide a transporting apparatus. It includes a supporting member to support at a certain height a continuous dough sheet that is continuously fed, sensors located at the supporting member to sense the positions of both edges of the dough sheet, a computing apparatus that calculates the center position of the dough sheet based on the results of the detection of the sensors, and a shifting apparatus that shifts the dough sheet right or left relative to the transporting direction of the dough sheet based on the results of the calculation, thereby preventing much of the dough sheet from being unavailable at both its sides at a following process, so that the productivity can increase.

PREFERRED EMBODIMENTS

Figure 1:
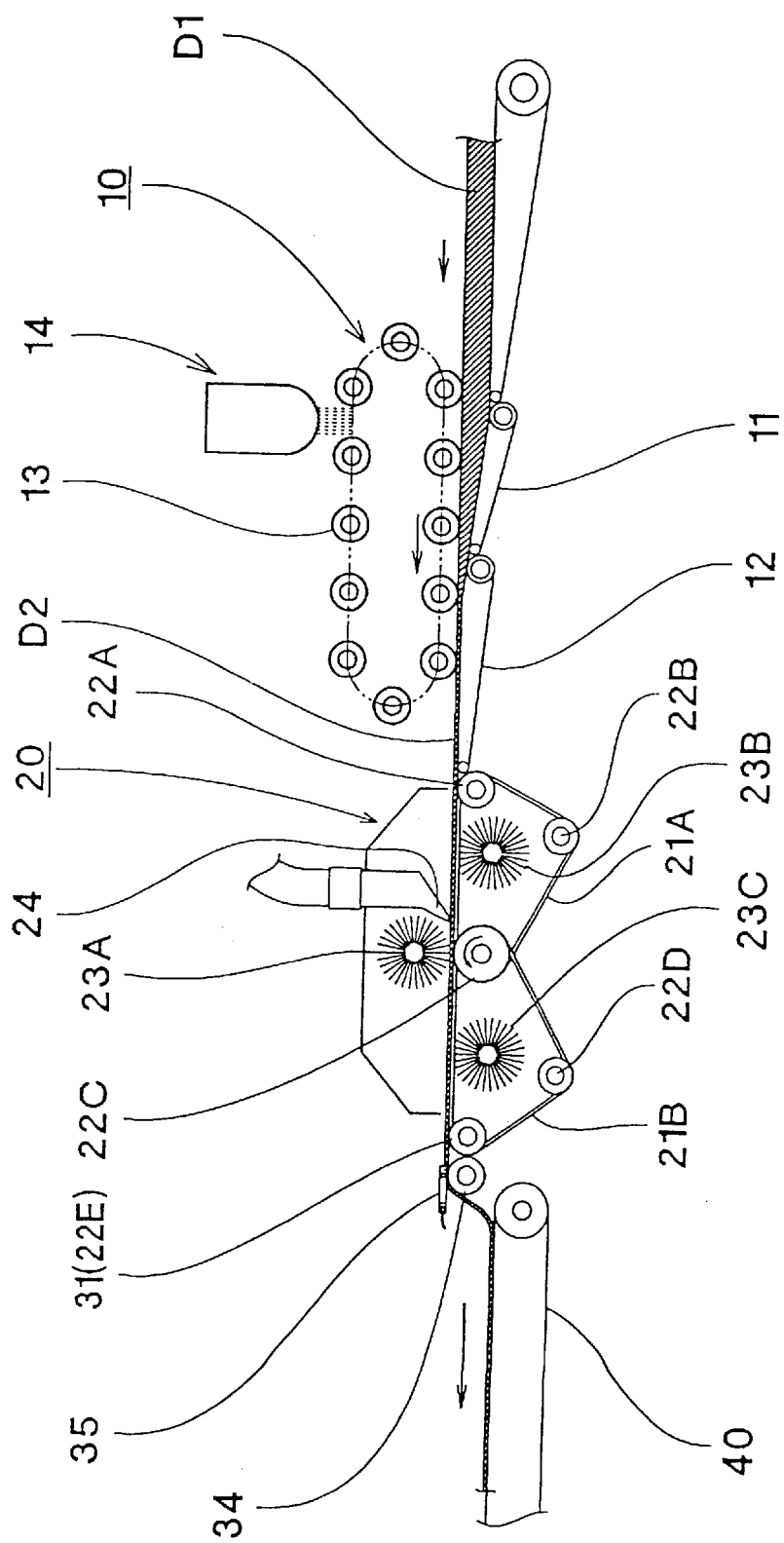
FIG. 1 is a side view of an apparatus that is used to practice an embodiment of this invention.

Based on the drawings we below explain the embodiments of this invention.

While a food dough sheet D1 for cake, bread, etc. is transported, it is extended by an extending apparatus 1 to form a thin extended dough sheet D2. It is then transported downstream. A flour-removing apparatus 20 removes excess flour from the surface of the dough sheet D2. Then, a shifting apparatus 30 shifts the dough sheet D2 horizontally right or left relative to the transporting direction. Then, the dough sheet D2 is further transported to a following process.

The extending apparatus 10 is a well-known apparatus. It has conveyor belts 11 and 12, which are sequentially located from upstream to downstream. Also, the extending apparatus 10 has a planetary roller mechanism 13, which is located above the conveyor belts 11 and 12. The planetary roller mechanism 13 comprises a plurality of rollers that are arranged at constant intervals.

The flour-removing apparatus 20 is located downstream of the extending apparatus 10. The flour-removing apparatus 20 has a conveying surface to support the dough sheet D2. The conveying surface is formed by ropes 21A and 21B. As in FIG. 1, the rope 21A passes around a plurality of rollers 22A, 22B, 22C to be engaged with the grooves formed on them. The rope is tightened on the rollers. Also, the rope 21B passes around the rollers 22C, 22D, 22E to be engaged with the grooves formed on them. It is also tightened on them. Thus, when the rollers 22A etc. rotate, the ropes 21A and 21B accordingly rotate with them, so that the dough sheet D2 is fed.

Rotating brushes 23A, 23B, and 23C are located at suitable intervals on or under the conveying surface formed by the ropes 21A, 21B. Each rotating brush has a rotating shaft from which many brushes radially project. When the rotating brushes rotate, the excess flour on the surface of the dough sheet D2 is removed while the dough sheet is being transported.

A vacuuming nozzle 24 is located upstream of and near the rotating brush 23A. A vacuuming apparatus (not shown) vacuums by means of the nozzle 24 the excess flour that has been removed by the brush.

The shifting apparatus 30 is now explained. It has a centering roller 31 (22E). The centering roller 31 (22E) is supported by a driving shaft 32 to shift right or left relative to the transporting direction of the dough sheet. The shaft 32 is supported by frames 37. The centering roller 31 can freely rotate in the rotating direction. An external thread is formed on the driving shaft 32. An internal thread is formed on each of the frames 37, so that each internal thread is engaged with the external thread. A motor 33 rotates the driving shaft. When the driving shaft 32 is rotated by the motor 33, the centering roller 31 can be reciprocated along the driving shaft 32 between the frames 37 to shift the dough sheet right or left. Thus, when the driving shaft 32 rotates a predetermined number of times, the centering roller 31 moves over a distance corresponding to the number of pitches of the threads.

A supporting roller 34 is located downstream of and near the centering roller 31 to support the dough sheet D2 at a predetermined height. The supporting roller 34 rotates at a speed that is the same as those of the ropes 21A, 21B and the centering roller 31 to feed the dough sheet downstream. The supporting roller 34 is made of non-adhesive materials, such as plastic. Sensors 35A and 35B are located at both sides of the supporting roller 34. To measure the distances to the edges of the dough sheet D2 when it passes on the supporting roller 34, the sensors used may be photoelectric sensors. A computing apparatus 36 is located to receive signals from the sensors 35A, 35B and to send an operation signal to the motor 33.

Downstream of the supporting roller 34 a conveyor 40 is located to transport the dough sheet to a following process.

The centering operation is now explained. When the dough sheet D2 passes through the flour-removing apparatus 20 and is fed on the supporting roller, the sensors 35a, 35B sense the edges of the dough sheet D2. The computing apparatus 36 calculates the distances to the edges of the dough sheet D2 and obtains data on the center position C1 of the dough sheet D2. If the computing apparatus determines that the center position C1 differs from the center position C of the transporting apparatus, the computing apparatus sends a signal to the motor 33 to rotate it a predetermined number of times according to that difference. The centering roller 31 accordingly moves right or left in the direction relative to the transporting direction (along the direction of one of the arrows S) over a distance corresponding to the difference between the center position C1 and the center position C.

Figure 2:
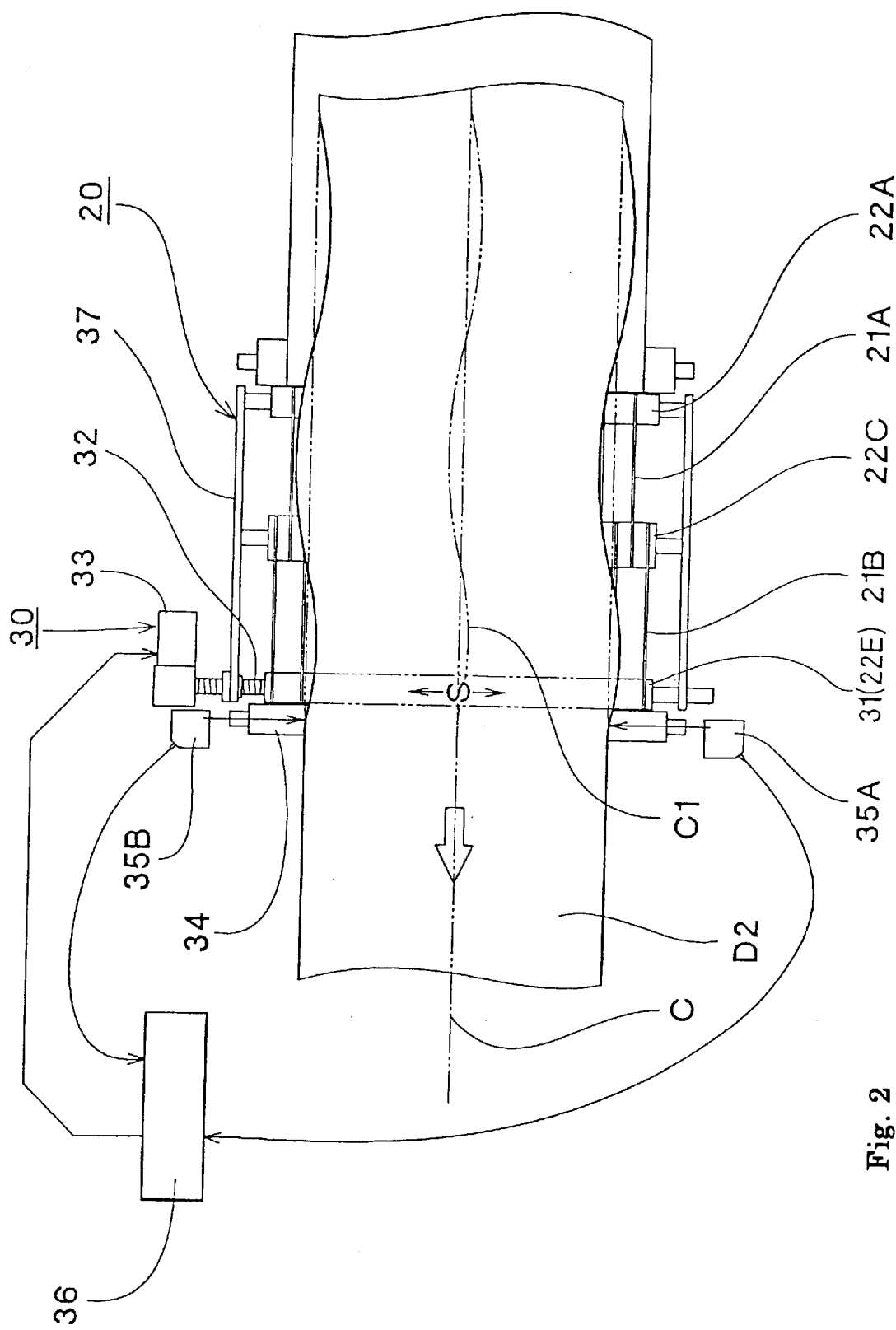
FIG. 2 is a plan view of the apparatus that is used to practice the embodiment of this invention.

The sensors 35A and 35B can continuously measure the distances to the edges of the dough sheet. Thus, the center position Cl of the dough sheet can be continuously aligned with the center C. FIG. 2 shows the dough sheet wherein it has a constant width. However, under the conditions wherein dough is supplied to the extending apparatus, the width of the dough sheet sometimes varies.

In the embodiment of this invention explained above, the sensors detect the edges of the dough sheet on the supporting roller 34, located downstream of and near the ropes 21A, 21B. However, if the edges of the dough sheet D2 on the ropes 21a, 21B are to be sensed, possibly they might not be correctly sensed or sensed at all, because possibly the dough sheet D2 might have crept between the ropes because of gravity so that the edges may vary in position. Thus, the supporting roller is needed to keep the dough sheet D2 at a constant height where the sensors can correctly sense the edges.

Figure 3:
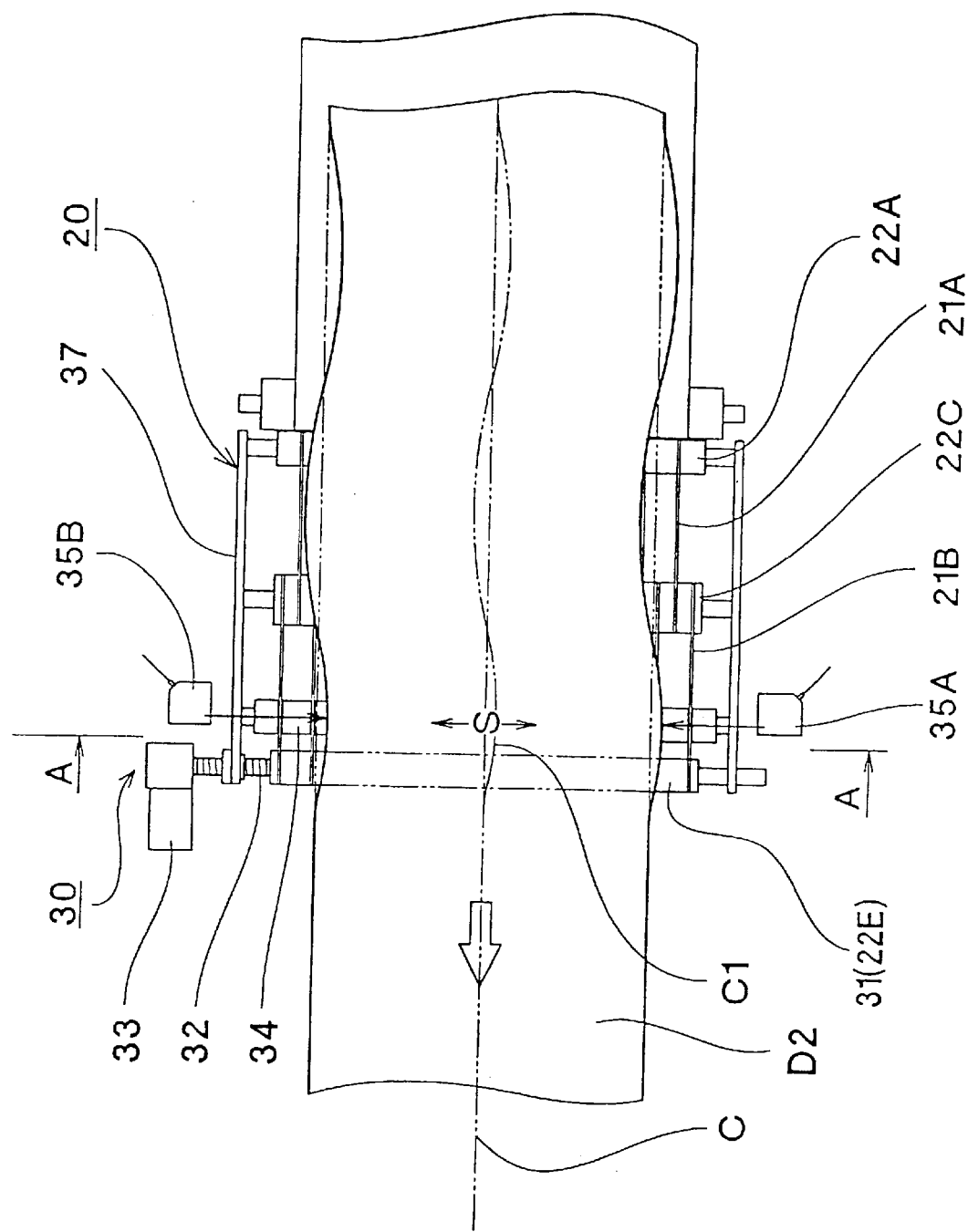
FIG. 3 is a plan view of an apparatus of another embodiment of this invention.
Figure 4:
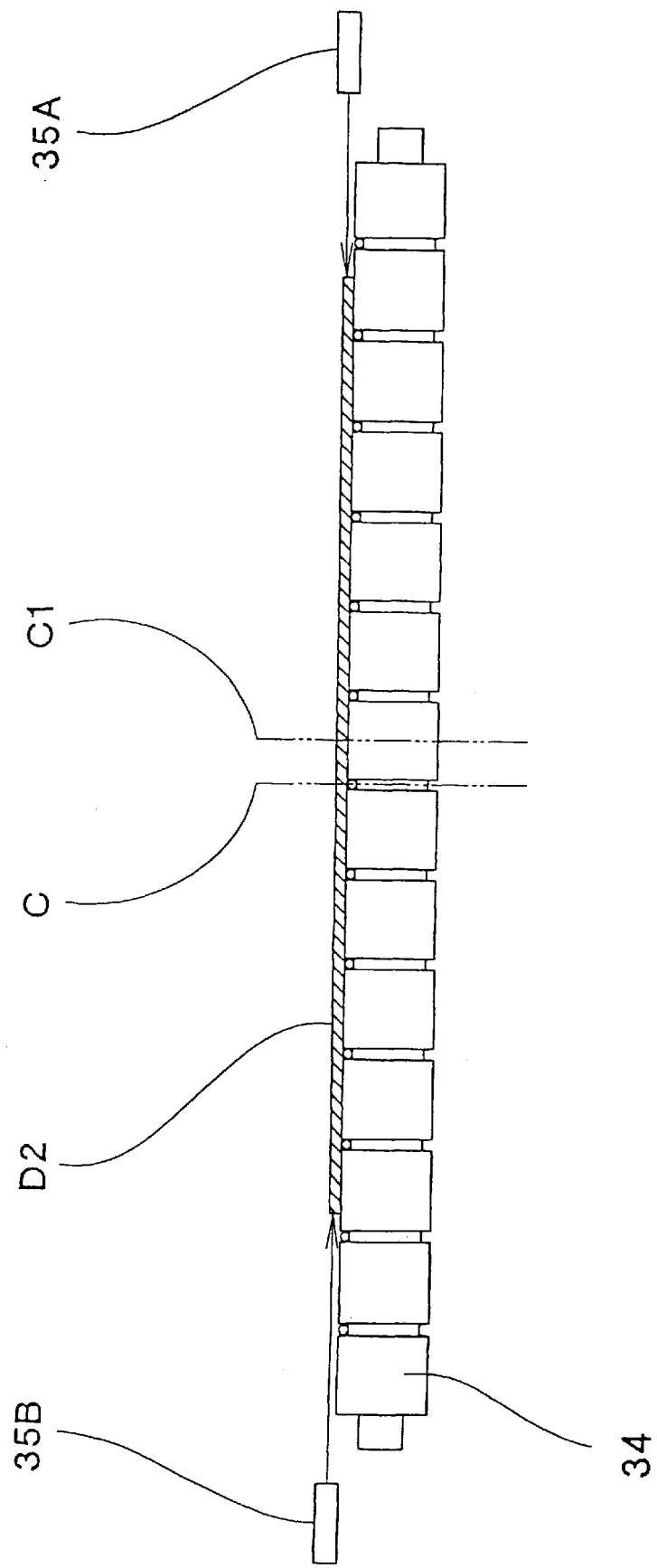
FIG. 4 is a sectional view along line A—A of the apparatus in FIG. 3.
Figure 5:
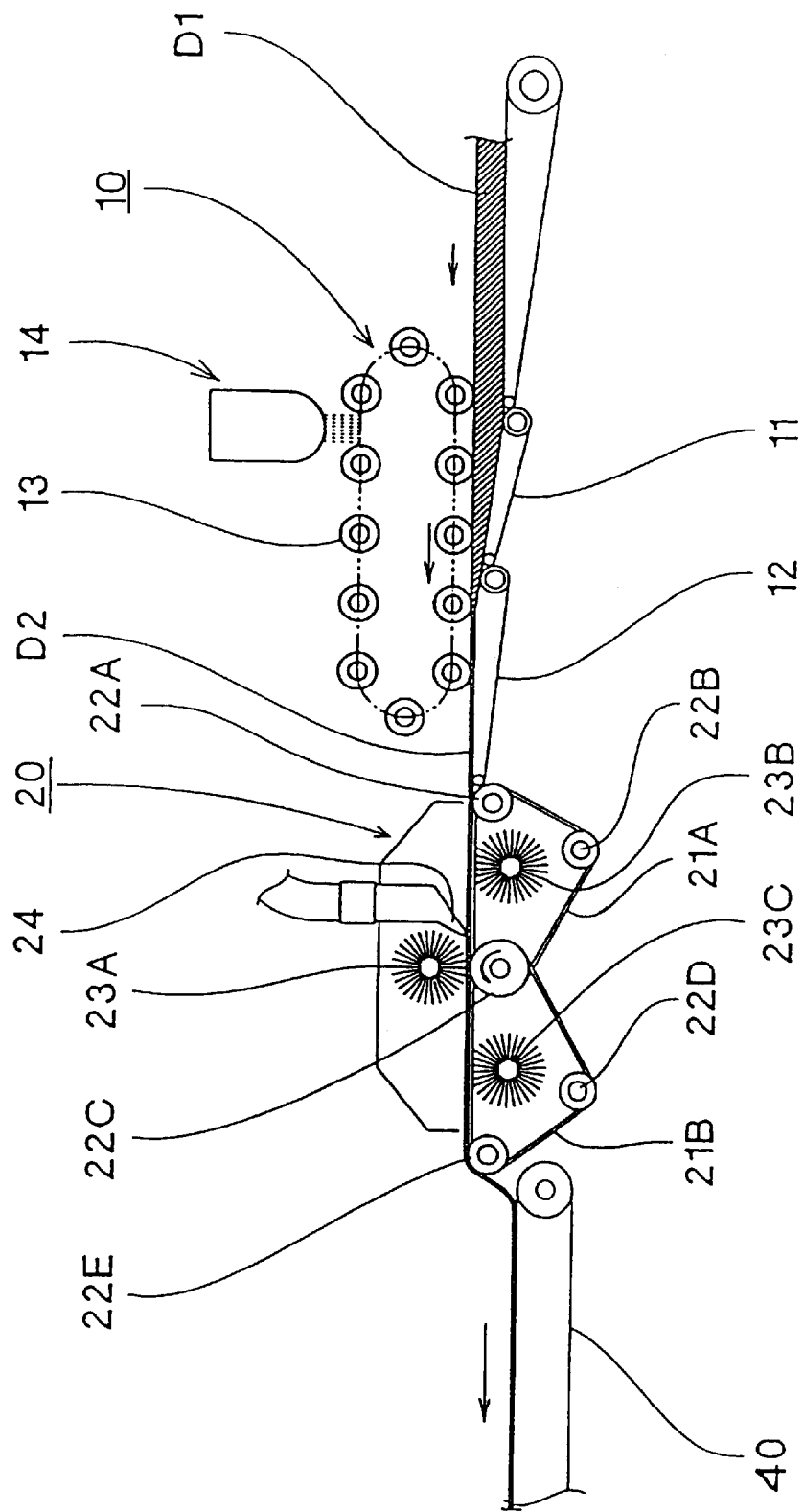
FIG. 5 is a side view of a conventional apparatus.
Figure 6:
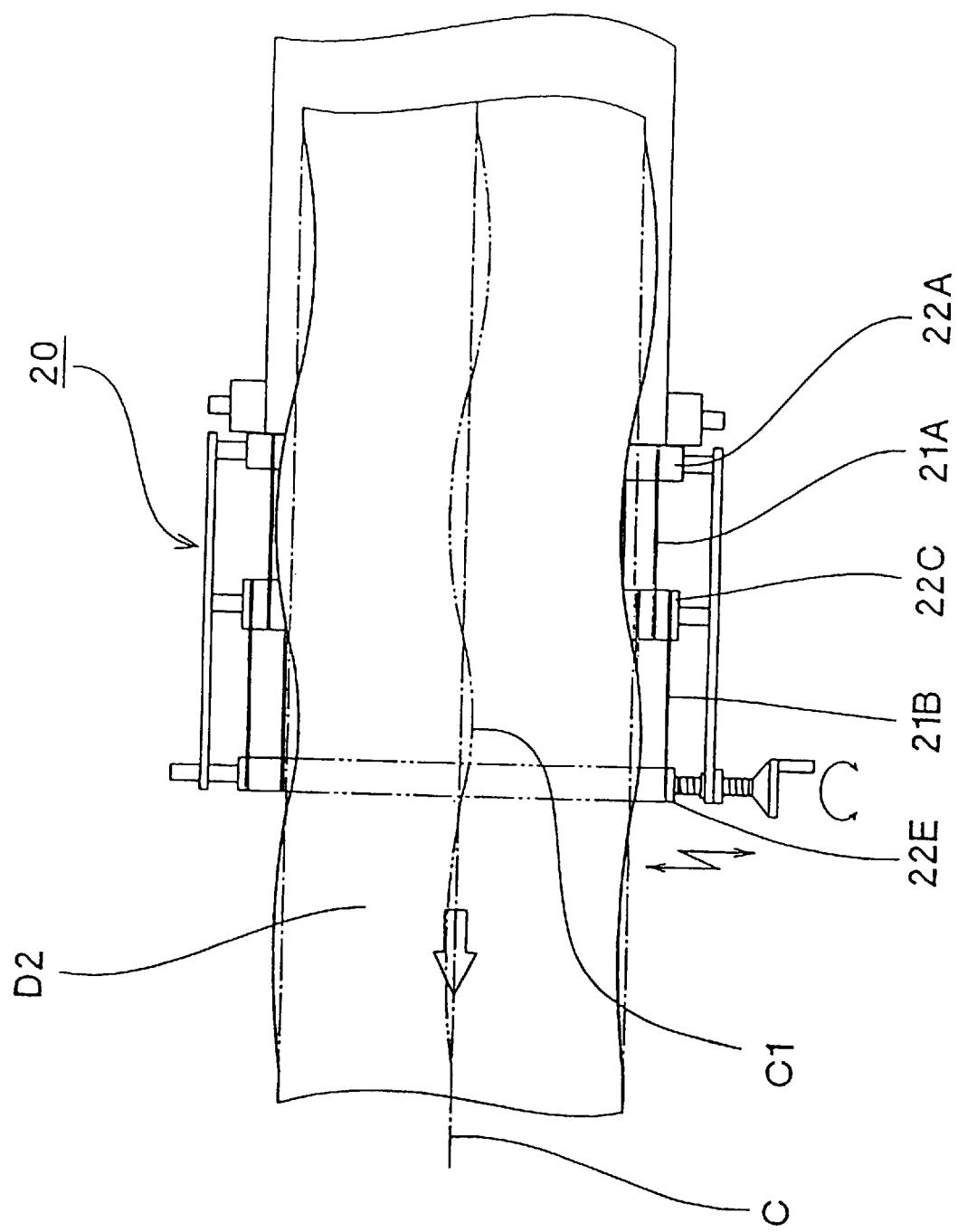
FIG. 6 is a plan view of the conventional apparatus.

As in FIG. 3, the supporting roller 34 may be located upstream of the centering roller 31 (unlike the above embodiment, where the supporting roller 34 is located downstream of the centering roller 31). In that case, as in FIGS. 3 and 4, grooves are formed on the supporting roller 34 to receive the ropes such that they are prevented from protruding from its supporting part of the surface. Thus, the dough sheet D2 is supported by the supporting part of the surface of the supporting roller, so that the dough sheet D2 can be kept at a constant height.

As explained above, this invention relates to an apparatus for continuously transporting a continuous dough sheet. It comprises a supporting member to support at a certain height a continuous dough sheet that is continuously fed, sensors located at the supporting member to sense the positions of both edges of the dough sheet, a computing apparatus that calculates the center position of the dough sheet based on the results of the detection of the sensors, and a shifting apparatus that shifts the dough sheet right or left relative to the transporting direction of the dough sheet based on the results of the computing. According to this invention, the center of the dough sheet can be aligned with the center of the transporting apparatus while the dough sheet is being fed. Thus, much of the dough sheet can be prevented from being unavailable at both its sides, so that the productivity can increase. Also, the centering and observing operations can be automatically performed, so that manual operations can be avoided.

What is claimed is:

1. An apparatus for continuously transporting a continuous dough sheet comprising a supporting member to support at a certain height a continuous dough sheet that is continuously fed, sensors located at the supporting member to sense the positions of both edges of the dough sheet, a computing apparatus that calculates the center position of the dough sheet based on the results of the detection by the sensors, and a shifting apparatus that shifts the dough sheet right or left relative to the transporting direction of the dough sheet based on the results of the computing.

2. The apparatus of claim 1 wherein said shifting apparatus includes a centering roller, a driving shaft, and a motor, wherein when the motor rotates based on the results of the computing, the driving shaft is rotated by the motor to reciprocate the centering roller along the driving shaft.

3. The apparatus of claim 2 wherein said supporting member includes a supporting roller, said supporting roller being located near the centering roller.

* * * * *